United States Patent
Lok et al.

(10) Patent No.: US 10,185,065 B2
(45) Date of Patent: Jan. 22, 2019

(54) OPTICALLY VARIABLE DEVICE

(75) Inventors: Phei Lok, Craigieburn (AU); Robert Arthur Lee, East Burwood (AU)

(73) Assignee: CCL Secure Pty Ltd, Craigieburn, Victoria (AU)

( * ) Notice: Subject to any disclaimer, the term of this patent is extended or adjusted under 35 U.S.C. 154(b) by 303 days.

(21) Appl. No.: 13/816,424

(22) PCT Filed: Aug. 9, 2011

(86) PCT No.: PCT/AU2011/001011
§ 371 (c)(1),
(2), (4) Date: May 17, 2013

(87) PCT Pub. No.: WO2012/019226
PCT Pub. Date: Feb. 16, 2012

(65) Prior Publication Data
US 2013/0258477 A1    Oct. 3, 2013

(30) Foreign Application Priority Data
Aug. 11, 2010 (AU) ............................ 2010903597

(51) Int. Cl.
*G02B 5/18* (2006.01)
*G02B 27/42* (2006.01)
*B42D 25/29* (2014.01)

(52) U.S. Cl.
CPC .......... *G02B 5/1828* (2013.01); *B42D 25/29* (2014.10); *G02B 5/1809* (2013.01); *G02B 27/4233* (2013.01)

(58) Field of Classification Search
CPC ...... G02B 5/18; G02B 5/1828; G02B 5/1809; G02B 5/1842; G02B 5/188; B42D 25/29;
(Continued)

(56) References Cited

U.S. PATENT DOCUMENTS

| 7,102,823 | B2 | 9/2006 | Schilling et al. |
| 7,679,826 | B2 | 3/2010 | Ezra |

(Continued)

FOREIGN PATENT DOCUMENTS

| WO | 8300395 | 2/1983 |
| WO | WO 1991/03747 | 3/1991 |

(Continued)

OTHER PUBLICATIONS

International Search Report dated Oct. 28, 2011 for International application No. PCT/AU2011/001011.
(Continued)

*Primary Examiner* — William R Alexander
*Assistant Examiner* — Ephrem Mebrahtu
(74) *Attorney, Agent, or Firm* — Christopher M. Scherer; DeWitt Ross & Stevens S.C.

(57) ABSTRACT

An optically variable device and method of manufacturing the device is disclosed, the device including a plurality of zero-order diffraction grating elements some of which are modulated such that a coloured at least partially polarized image is visible to a person viewing the device, observing a first optically variable effect when the device is rotated about an axis substantially perpendicular to the plane, and a second optically variable effect when the device is viewed under polarized light and rotated about an axis substantially perpendicular to or parallel with the plane. The device is particularly suitable for security documents such as bank notes. Preferably, the first optically variable effect is produced by a change in brightness and/or color of the grating elements and the second optically variable effect may likewise be produced by a change in brightness and/or color of the grating elements. The device advantageously provides two different types of optically variable effect may be provided in a single device. This is possible due to the use (Continued)

of zero-order grating elements as the "pixels" of the colored image. Each pixel, under illumination by unpolarized light, produces reflected light of a defined color which is also at least partially polarized.

20 Claims, 7 Drawing Sheets (58) Field of Classification Search
CPC .... B42D 25/328; B42D 25/391; B42D 25/30; G03H 1/0011; G03H 1/0244; G03H 2250/14
USPC ................ 359/562, 563, 566, 569, 573, 576
See application file for complete search history.

(56) References Cited

U.S. PATENT DOCUMENTS

| | | |
|---|---|---|
| 2005/0030626 A1 | 2/2005 | Weiteneder et al. |
| 2005/0128590 A1* | 6/2005 | Schilling ................ B42D 25/29 359/558 |
| 2006/0274392 A1* | 12/2006 | Schilling .............. G02B 5/1819 359/13 |
| 2007/0081246 A1* | 4/2007 | Stuck .................... G02B 5/1861 359/568 |
| 2007/0247714 A1* | 10/2007 | Schnieper ............ G02B 5/1809 359/558 |
| 2007/0279745 A1 | 12/2007 | Klemann |
| 2008/0204876 A9 | 8/2008 | McGrew |
| 2008/0259455 A1* | 10/2008 | Stuck ..................... B82Y 20/00 359/568 |
| 2009/0190223 A1 | 7/2009 | Petiton et al. |
| 2010/0307705 A1* | 12/2010 | Rahm .................... B42D 25/00 162/140 |

FOREIGN PATENT DOCUMENTS

| | | |
|---|---|---|
| WO | 2003059643 A1 | 7/2003 |
| WO | WO 2005/049745 | 6/2005 |
| WO | WO 2006/038120 | 4/2006 |

OTHER PUBLICATIONS

Written Opinion of the International Searching Authority dated Oct. 28, 2011 for International application No. PCT/AU2011/001011.
Van Renesse, Rudolf L., "Zero-Order Grating Microstructures", Optical Document Security—second edition, chapter 12, 1988, 267-287.

* cited by examiner

OPTICALLY VARIABLE DEVICE

FIELD OF THE INVENTION

The present invention relates to optically variable devices, and is particularly, though not exclusively, useful as an anti-counterfeiting measure in banknotes and other security documents.

BACKGROUND TO THE INVENTION

Security printers face a constant challenge in staying ahead of counterfeiters, who have increasing access to advanced replication technology. For example, printed elements and diffractive relief structures, which are commonly used as security features in banknotes, can be susceptible to reproduction by optical scanning and contact copying, respectively.

The security document designer must therefore employ increasingly technically advanced features for securing documents against forgery. At the same time, it is desirable for these security features to be easily recognisable as such, so that a person scrutinising the document is aware of what to look for in an authentic document.

One commonly employed and easily recognisable feature is a printed image, for example in the form of a portrait of a famous person. Traditionally, such images were applied to banknotes by techniques such as intaglio printing, often including a guilloché (fine line) pattern. The result was an image having a characteristic appearance and tactile impression which, at the time, was difficult for counterfeiters to reproduce.

More secure authentication features can be produced by employing optically variable structures, such as diffraction gratings, which change in appearance as the observer changes their angle of view relative to the structure.

The above features can be combined by providing a security device having a tonal image which also exhibits an optically variable diffractive effect. Such an image can be produced by dividing a digitised (bitmapped) version of an input optically invariable image into an array of N×M pixels, as described in WO 91/03747. If the original image is black and white, then each pixel will have a greyscale value (grey level) corresponding to the brightness of the corresponding part of the image. A diffraction grating element can then be assigned to each pixel, the curvature of the grooves in each grating element being dependent on (e.g., inversely proportional to) the grey level of the corresponding pixel. The net effect produced to a person viewing the security feature is a halftone or continuous tone monochrome image which changes tone and/or colour as the viewing angle changes.

The security feature described above, known as a "Pixelgram", is thus a mapping from an input continuous-tone image to a mosaic of diffraction gratings having both an optically variable component (tone/colour change on change of viewing angle) and an optically invariable component (continuous-tone portrait), thereby providing enhanced resistance to counterfeiting over a security feature having either component on its own.

In view of the continuing need to increase the difficulty to the counterfeiter, it is desirable to provide an improved security device having additional levels of authentication to those offered by known security devices such as those described above.

DEFINITIONS

Security Document

As used herein the term security document includes all types of documents and tokens of value and identification documents including, but not limited to the following: items of currency such as banknotes and coins, credit cards, cheques, passports, identity cards, securities and share certificates, driver's licenses, deeds of title, travel documents such as airline and train tickets, entrance cards and tickets, birth, death and marriage certificates, and academic transcripts.

The invention is particularly, but not exclusively, applicable to security documents such as banknotes or identification documents such as identity cards or passports formed from a substrate to which one or more layers of printing are applied.

Substrate

As used herein, the term substrate refers to the base material from which the security document or token is formed. The base material may be paper or other fibrous material such as cellulose; a plastic or polymeric material including but not limited to polypropylene (PP), polyethylene (PE), polycarbonate (PC), polyvinyl chloride (PVC), polyethylene terephthalate (PET); or a composite material of two or more materials, such as a laminate of paper and at least one plastic material, or of two or more polymeric materials.

The use of plastic or polymeric materials in the manufacture of security documents pioneered in Australia has been very successful because polymeric banknotes are more durable than their paper counterparts and can also incorporate new security devices and features. One particularly successful security feature in polymeric banknotes produced for Australia and other countries has been a transparent area or "window".

Transparent Windows and Half Windows

As used herein the term window refers to a transparent or translucent area in the security document compared to the substantially opaque region to which printing is applied. The window may be fully transparent so that it allows the transmission of light substantially unaffected, or it may be partly transparent or translucent partially allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting least one opacifying layer in the region forming the window area. If opacifying layers are applied to both sides of a transparent substrate a fully transparent window may be formed by omitting the opacifying layers on both sides of the transparent substrate in the window area.

A partly transparent or translucent area, hereinafter referred to as a "half-window", may be formed in a polymeric security document which has opacifying layers on both sides by omitting the opacifying layers on one side only of the security document in the window area so that the "half-window" is not fully transparent, but allows some light to pass through without allowing objects to be viewed clearly through the half-window.

Alternatively, it is possible for the substrates to be formed from an substantially opaque material, such as paper or fibrous material, with an insert of transparent plastics material inserted into a cut-out, or recess in the paper or fibrous substrate to form a transparent window or a translucent half-window area.

Opacifying layers

One or more opacifying layers may be applied to a transparent substrate to increase the opacity of the security document. An opacifying layer is such that $L_T<L_0$, where $L_0$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Security Device or Feature

As used herein the term security device or feature includes any one of a large number of security devices, elements or features intended to protect the security document or token from counterfeiting, copying, alteration or tampering. Security devices or features may be provided in or on the substrate of the security document or in or on one or more layers applied to the base substrate, and may take a wide variety of forms, such as security threads embedded in layers of the security document; security inks such as fluorescent, luminescent and phosphorescent inks, metallic inks, iridescent inks, photochromic, thermochromic, hydrochromic or piezochromic inks; printed and embossed features, including relief structures; interference layers; liquid crystal devices; lenses and lenticular structures; optically variable devices (OVDs) such as diffractive devices including diffraction gratings, holograms and diffractive optical elements (DOEs).

Zero-order Diffraction Grating

A zero-order diffraction grating is a surface-relief or buried microstructure which produces light in only the zero diffraction order under illumination by light of a given wavelength.

Generally, such zero-order structures have a periodicity which is less than the desired wavelength of incident light. For this reason, zero-order diffraction gratings are sometimes also known as sub-wavelength gratings.

SUMMARY OF THE INVENTION

In one aspect, the present invention provides an optically variable device, including:

a plurality of zero-order diffraction grating elements disposed in a plane, a group of said zero-order diffraction grating elements in at least one region of the device being modulated within said region such that a coloured, at least partially polarised image is visible to a person viewing the device, wherein the person viewing the device observes a first optically variable effect when the device is rotated about an axis substantially perpendicular to the plane, and a second optically variable effect when the device is viewed under polarised light and rotated about an axis substantially perpendicular to or parallel with the plane.

Preferably, the first optically variable effect is produced by a change in brightness and/or colour of the grating elements. The second optically variable effect may likewise be produced by a change in brightness and/or colour of the grating elements.

The invention thus provides an improvement over known devices, in that at two different types of optically variable effect may be provided in a single device. This is possible due to the use of zero-order grating elements as the "pixels" of the coloured image. Each pixel, under illumination by unpolarised light, produces reflected light of a defined colour which is also at least partially polarised.

A first level of authentication is provided by a first optically variable effect in the form of an overt change in the image which is visible to the viewer as the angle of view is changed, for example by rotation of the device about an axis perpendicular to the plane of the device. A second optically variable effect in the form of a covert image change can be seen by viewing the device under polarised light, for example by superposing a polarising filter over the device.

In one preferred embodiment, the first and/or second optically variable effect is a change in shape of the image.

Preferably, at least one grating parameter of the zero-order diffraction grating elements in said region is modulated relative to grating parameters of neighbouring zero-order diffraction grating elements.

Alternatively, or additionally, at least one grating parameter of the zero-order diffraction grating elements in said region may be modulated within at least some of said zero-order diffraction grating elements.

Preferably, the zero-order diffraction grating elements comprise rectilinear or curvilinear grooves, and the modulation is performed with respect to spatial frequency, groove curvature, groove depth, or a combination of these.

Modulation of the grating elements (pixels) allows for the generation of a substantially continuous-tone image, for example a continuous-tone portrait, which may be multicoloured or monochrome.

For example, to produce a continuous-tone monochrome red image, the grating elements may each have an average period (the inverse of the spatial frequency) which is close to half the wavelength of red light, $\lambda_{red}/2$, this being the period at which the reflected intensity of red light would be at a maximum. The periodicity of the grooves of a given pixel may then be varied slightly within the pixel, away from the optimal period of $\lambda_{red}/2$, to decrease the brightness of the pixel. Alternatively, each pixel could have a constant spatial frequency, but with the spatial frequency being modulated across, rather than within, pixels in order to produce variations in brightness.

An alternative way to produce brightness variations is to modulate the curvature of grooves in the pixels. A pixel into which more curvature has been introduced will produce a lower intensity of reflected light than one in which the grooves are less curved.

It is also, of course, possible to produce multicoloured continuous-tone images, in which pixels in a first subset have a period corresponding to half the wavelength of red light, pixels in a second subset have a period corresponding to half the wavelength of blue light, pixels in a third subset have a period corresponding to half the wavelength of green light, and so on. The brightness of pixels in a subset can then be modulated by varying the spatial frequency or groove curvature as described above.

In an alternative embodiment, the surface density (number of pixels per unit area) of the zero-order diffraction grating elements within said region may be modulated to produce variations in brightness. For example, the grating elements may be applied to the device so as to cover a surface area which is proportional to the brightness of the corresponding region of an input half-tone or continuous-tone image.

If the spatial frequency of the zero-order diffraction grating elements is modulated, the modulation may be performed according to a harmonic or a non-harmonic function. This may provide an additional level of security in that only the manufacturer of the optically variable device will know the parameters of the function which was used to perform the modulation.

In one preferred embodiment, the grooves of the diffraction grating elements are electrically conductive and are separated by non-conducting regions. The grooves may be formed from a conducting material, such as a material including metallic nanoparticles. Metallic nanoparticles can produce special colour effects which are not possible with other metallic materials.

In another embodiment, the grooves are formed of a non-conducting material to which a conducting material is applied.

In a particularly preferred embodiment, the grooves are formed in a first dielectric material which is in contact with a second dielectric material, the second dielectric material having a different refractive index to the first dielectric material. The grooves may be embedded in the second dielectric material.

In a second aspect, the invention provides a security document including an optically variable device according to any of the above described embodiments.

In a further aspect, there is provided a method of manufacturing an optically variable device, including the steps of:

forming a plurality of zero-order diffraction grating elements in or on a surface, a group of the zero-order diffraction grating elements in at least one region of the device being modulated within said region such that a coloured, at least partially polarised image is visible to a person viewing the device, wherein the person viewing the device observes a first optically variable effect when the device is rotated about an axis substantially perpendicular to the surface, and a second optically variable effect when the device is viewed under polarised light and rotated about an axis substantially perpendicular to or parallel with the surface.

The method may further include the step of applying a layer of a first dielectric material to the surface, wherein the zero-order diffraction grating elements are formed in the first dielectric material. The first dielectric material may be an embossable radiation-curable ink.

The zero-order diffraction grating elements may be embossed in the first dielectric material. The method may then further include the step of curing the first dielectric material in at least the embossed regions.

In a preferred embodiment, the zero-order diffraction grating elements are applied by an embossing cylinder having a plurality of grooves, the grooves being aligned substantially perpendicular to the axis of rotation of the embossing cylinder.

The method preferably further includes the step of coating the zero-order diffraction grating elements with a second dielectric material, the second dielectric material having a different refractive index to the first dielectric material.

Embossable Radiation Curable Ink

The term embossable radiation curable ink used herein refers to any ink, lacquer or other coating which may be applied to the substrate in a printing process, and which can be embossed while soft to form a relief structure and cured by radiation to fix the embossed relief structure. The curing process does not take place before the radiation curable ink is embossed, but it is possible for the curing process to take place either after embossing or at substantially the same time as the embossing step. The radiation curable ink is preferably curable by ultraviolet (UV) radiation. Alternatively, the radiation curable ink may be cured by other forms of radiation, such as electron beams or X-rays.

The radiation curable ink is preferably a transparent or translucent ink formed from a clear resin material. Such a transparent or translucent ink is particularly suitable for printing light-transmissive security elements such as numerical-type DOEs and lens structures.

In one particularly preferred embodiment, the transparent or translucent ink preferably comprises an acrylic based UV curable clear embossable lacquer or coating.

Such UV curable lacquers can be obtained from various manufacturers, including Kingfisher Ink Limited, product ultraviolet type UVF-203 or similar. Alternatively, the radiation curable embossable coatings may be based on other compounds, eg nitro-cellulose.

The radiation curable inks and lacquers used in the invention have been found to be particularly suitable for embossing microstructures, including diffractive structures such as DOEs, diffraction gratings and holograms, and microlenses and lens arrays. However, they may also be embossed with larger relief structures, such as non-diffractive optically variable devices.

The ink is preferably embossed and cured by ultraviolet (UV) radiation at substantially the same time. In a particularly preferred embodiment, the radiation curable ink is applied and embossed at substantially the same time in a Gravure printing process.

Preferably, in order to be suitable for Gravure printing, the radiation curable ink has a viscosity falling substantially in the range from about 20 to about 175 centipoise, and more preferably from about 30 to about 150 centipoise. The viscosity may be determined by measuring the time to drain the lacquer from a Zahn Cup #2. A sample which drains in 20 seconds has a viscosity of 30 centipoise, and a sample which drains in 63 seconds has a viscosity of 150 centipoise.

With some polymeric substrates, it may be necessary to apply an intermediate layer to the substrate before the radiation curable ink is applied to improve the adhesion of the embossed structure formed by the ink to the substrate. The intermediate layer preferably comprises a primer layer, and more preferably the primer layer includes a polyethylene imine. The primer layer may also include a cross-linker, for example a multi-functional isocyanate. Examples of other primers suitable for use in the invention include: hydroxyl terminated polymers; hydroxyl terminated polyester based co-polymers; cross-lined or uncross-linked hydroxylated acrylates; polyurethanes; and UV curing anionic or cationic acrylates. Examples of suitable cross-linkers include: isocyanates; polyaziridines; zirconium complexes; aluminium acetylacetone; melamines; and carbodiimides.

The type of primer may vary for different substrates and embossed ink structures. Preferably, a primer is selected which does not substantially affect the optical properties of the embossed ink structure.

In another possible embodiment the radiation curable ink may include metallic particles to form a metallic ink composition which is both printable and embossable. Such a metallic ink composition may be used to print a reflective security element, such as a diffraction grating or hologram. Alternatively, a transparent ink, e.g. formed from a clear resin, may be applied on one side of the substrate, with or without an intermediate primer layer, the transparent ink then being embossed and cured with radiation and a metallic ink composition subsequently applied to the embossed transparent ink in a printing process, if it is desired to form a reflective security element as part of the security device.

It is also possible for the metallic ink composition to be applied in a layer which is sufficiently thin to allow the transmission of light.

When a metallic ink is used, it preferably comprises a composition including metal pigment particles and a binder. The metal pigment particles are preferably selected from the group comprising: aluminium, gold, silver, platinum, copper, metal alloy, stainless steel, nichrome and brass. The metallic ink preferably has a low binder content and a high pigment to binder ratio. Examples of metallic ink compositions suitable for use in the present invention are described in WO2005/049745 of Wolstenholme International Limited, which describes coating compositions suitable for use in coating a diffraction grating comprising metal pigment particles and a binder, wherein the ratio of pigment to binder is sufficiently high as to permit the alignment of the pigment particles to the contours of the diffraction grating. Suitable binders may comprise any one or more selected from the group comprising nitrocellulose, ethyl cellulose, cellulose acetate, cellulose acetate propionate (CAP), cellulose acetate butyrate (CAB), alcohol soluble propionate (ASP), vinyl chloride, vinyl acetate co-polymers, vinyl acetate, vinyl, acrylic, polyurethane, polyamide, rosin ester, hydrocarbon, aldehyde, ketone, urethane, polyethyleneterephthalate, terpene phenol, polyolefin, silicone, cellulose, polyamide and rosin ester resins. In one particularly preferred metallic ink composition, the binder comprises nitro cellulose and polyurethane.

The pigment to binder ratio preferably falls substantially within the range from about 5:1 to about 0.5:1 by weight, and more preferably falls substantially within the range from about 4:1 to about 1:1 by weight.

The metal pigment content by weight of the composition is preferably less than about 10%, and more preferably less than about 6%. In particularly preferred embodiments, the pigment content by weight of the composition falls substantially in the range from about 0.2% to about 6%, and more preferably from about 0.2% to about 2%.

The average particle diameter may be in the range from about 2 μm to about 20 μm, preferably in the range from about 5 μm to about 20 μm, and more preferably in the range from about 8 μm to about 15 μm.

The thickness of the pigment particles is preferably less than about 100 nm and more preferably less than about 50 nm. In one embodiment, the thickness of the pigment particles falls substantially within the range from 10-50 nm. In another embodiment, the thickness of the pigment particles falls substantially within the range from 5-35 nm, and in another embodiment the average thickness of the pigment particles falls substantially within the range from 5-18 nm.

Embossable UV curable ink compositions such as described above have been found to be particularly suitable for embossing to form optically diffractive security devices, such as diffraction gratings, holograms and diffractive optical elements.

In the case of a half-window in which the transparent region is covered on one side by at least one opacifying layer, a security device formed from an embossed metallic ink may be a reflective device which is only visible in the half-window from the opposite side of the substrate, which is not covered by an opacifying layer in the half-window area.

It is also possible for the opacifying layer, which covers the half-window area on one side of the substrates, to allow the partial transmission of light so that the security device formed by the embossed ink is partially visible in transmission from the side, which is covered by the opacifying layer in the half-window area.

BRIEF DESCRIPTION OF THE DRAWINGS

Particular embodiments of the invention will now be described, by way of non-limiting example only, with reference to the accompanying figures in which.

DESCRIPTION OF PREFERRED EMBODIMENT

Figure 1:
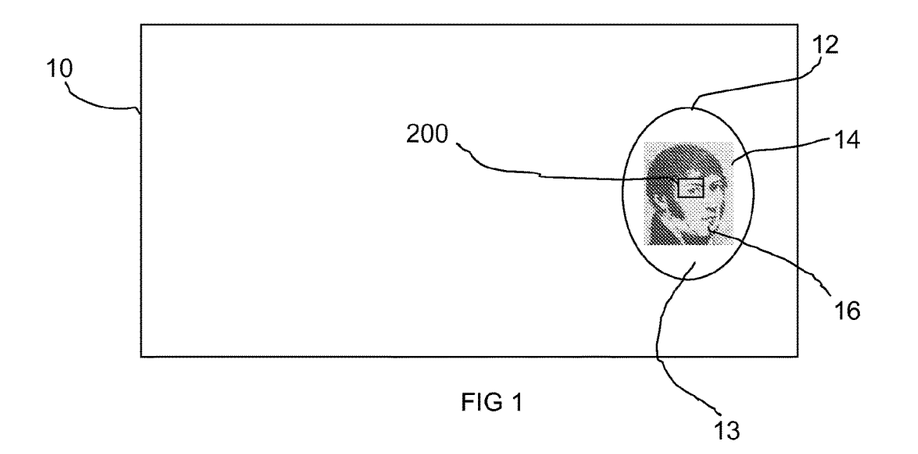
FIG. 1 shows a security document including an optically variable device according to one embodiment of the invention.

Referring initially to FIG. 1, there is shown a security document in the form of a banknote 10 having a transparent window region 12 in which is contained an optically variable device 14, and an area 13 which does not contain any optically variable structures. The optically variable device 14 may be applied as a separately manufactured transfer foil within window 12, or may be incorporated in the security document by applying an embossable radiation curable ink (as described above) within the window 12 and then forming the device in the embossable ink.

The optically variable device 14 contains a plurality of zero-order diffraction grating elements which collectively form a tonal portrait 16. Portrait 16 may be multicoloured or may be monochromatic. In the example shown in FIG. 1, each zero-order grating element or pixel is arranged to produce reflected light in the red part of the spectrum, but with the brightness (tone) of each pixel being modulated so as to produce an impression of a tonal macroscopic image 16 to the viewer.

Figure 2:
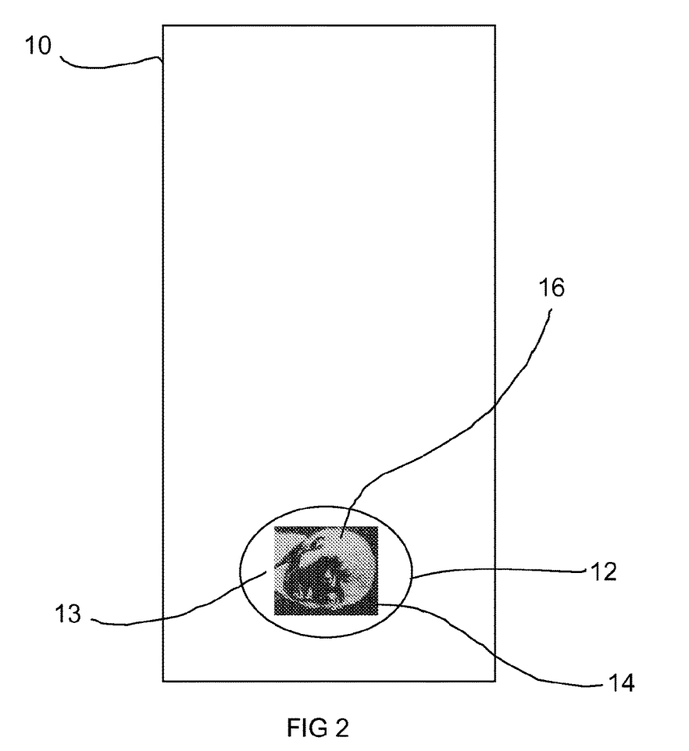
FIG. 2 shows the security document of FIG. 1, rotated clockwise through an angle of 90 degrees to produce a first optically variable effect.

In FIG. 2, the banknote of FIG. 1 is shown rotated clockwise, i.e. about an axis which is perpendicular to the plane of the banknote, through 90 degrees. This results in a switch from positive to negative tone of the image 16, which is also accompanied by a colour switch from red to green. This is possible due to the behaviour under rotation of the individual zero-order pixels making up the image 16.

Figure 3:
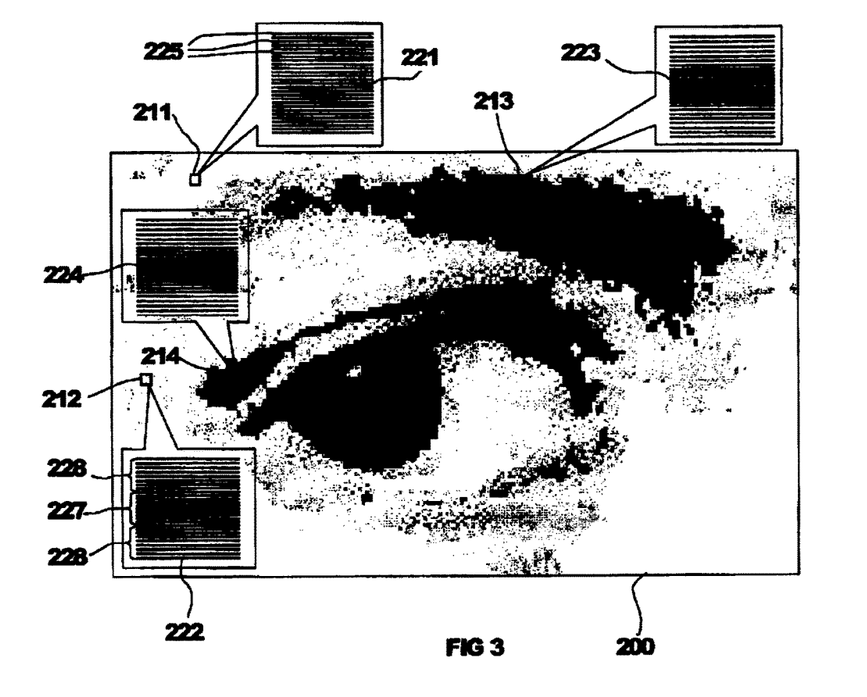
FIG. 3 is a close-up of part of the optically variable device of FIG. 1.

Referring now to FIG. 3, there is shown a greatly magnified view of the region 200 of FIG. 1. The region 200 includes pixels having four different brightness levels, for example in regions 211 (brightest), 212 (next brightest), 213

(dark) and 214 (darkest). The variation in brightness is achieved by modulating the spatial frequency of the zero-order pixels 221, 222, 223, 224 (shown in magnified exploded view) in the corresponding image area. It will be appreciated that each region 211, 212, 213, 214 contains multiple pixels, but only a single pixel is shown in FIG. 3 for illustration purposes.

The device of FIGS. 1 to 3 contains only four brightness levels, but it will be appreciated that any desired number of discrete brightness levels could be chosen to create a half-tone zero-order diffractive image 16. Since the groove curvature, spatial frequency and groove depth may be varied in substantially continuous fashion (subject to the maximum resolution of the technology used to create the embossing master for replicating the device), it will also be appreciated that a substantially continuous-tone image may be produced.

In the brightest areas 211 of the image, the corresponding zero-order grating elements 221 are not modulated in spatial frequency, i.e. the spacing between adjacent rectilinear grooves 225 remains constant and is approximately equal to half the wavelength of red light. To decrease the brightness slightly, a small amount of spatial frequency modulation is introduced into pixels 222 in regions 212. The spatial frequency is slightly greater in the central region 227 of pixel 222 compared to the outer regions 228, and this leads to a reduction in intensity of reflected red light for those pixels.

The grating elements (pixels) 222, 223, 224 could alternatively be modulated by varying the groove curvature or groove depth within the pixel (not shown).

The device 14 shown in FIGS. 1 to 3 exhibits a change of image colour and tone when rotated through 90 degrees. In an alternative embodiment, the device 14 could be made to undergo a shape change, by designing certain of the zero-order pixels to switch "on" or "off" when the device is rotated. For example, pixels which reflect red light in the zero-order (the "on" state) could be designed with grating parameters such that, under rotation, they no longer produce reflected light in the visible part of the spectrum, thus appearing dark (the "off" state) to the viewer. Conversely, other pixels in the image could appear dark (the "off" state) when the device 14 is oriented as in FIG. 1, but reflect visible light of a particular colour when the device 14 is oriented as in FIG. 2 (the "on" state). By appropriate placement of such on-off pixels relative to each other in the image, a change in shape of the image can be made apparent to the viewer when the device 14 is rotated.

Figure 4:
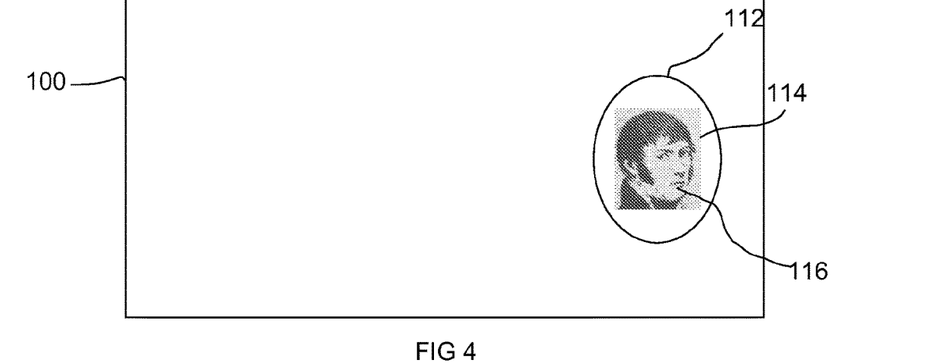
FIGS. 4, 5 and 6 show a second optically variable effect produced by the optically variable device of FIG. 1.
Figure 5:
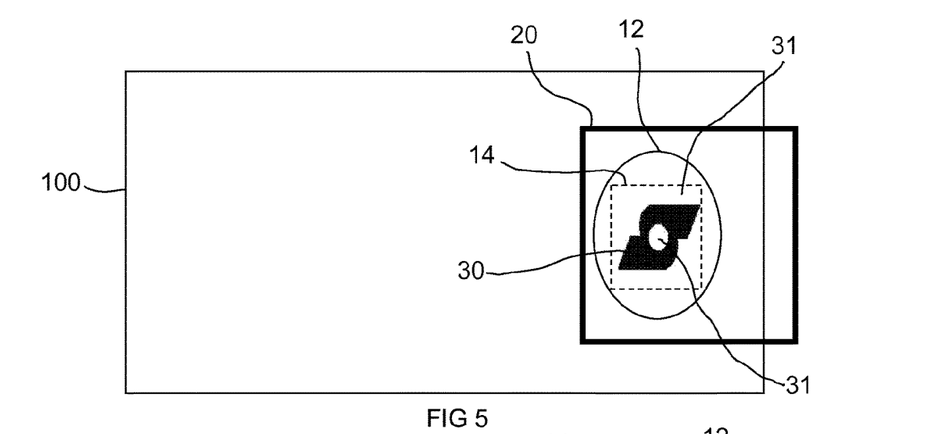
Figure 6:
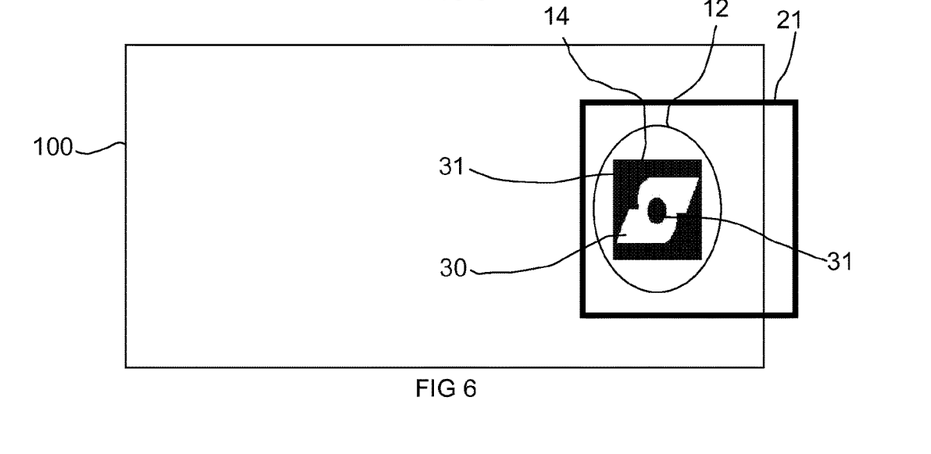

Referring now to FIGS. 4 to 6, there is shown an alternative security document 100 which includes an optically variable device 114 in a window area 112. The optically variable device 114 includes a portrait image 116.

FIG. 4 shows the banknote 100 and device 114 as they would appear to a viewer under unpolarised illumination. It is noted that the pixels 221, 222, 223, 224 of the device 14 of FIGS. 1 to 3 are all shown with grating lines having the same orientation, and thus direction of polarisation. However, some of the pixels in the device 114 may be chosen to have different orientation, for example a second orientation which is orthogonal to that of pixels 221, 222, 223, 224, so that they produce reflected polarised light having a second, different direction of polarisation. This allows for the production of a second optically variable effect when the device 114 is viewed under a polarising filter, as shown in FIG. 5.

In FIG. 5, the device 114 is viewed through a polariser 20 which only allows incident or reflected light of a first polarisation, corresponding to the polarisation produced by pixels 221-224, to pass therethrough. Pixels producing this polarisation will appear bright to the viewer. In FIG. 5, the pixels in white (bright) regions 31 are those having the first polarisation. The pixels in region 30 have the second (orthogonal) orientation and are filtered out, thus appearing dark to the viewer. By patterning the device 114 with differently oriented pixels according to a particular motif or image, a shape change effect is thus produced to the viewer observing the device 114 under polarised light (i.e., through a polarisation filter).

If a polariser 21 which only transmits light of the second polarisation is used to view the device 114 as in FIG. 6, then a switch in tone occurs, because pixels in regions 31 now appear dark whilst pixels in region 30 appear bright.

Figure 7:
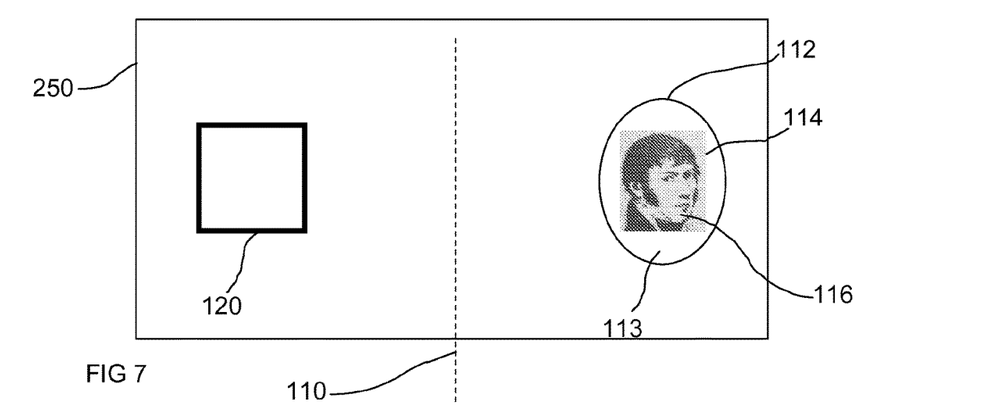
FIG. 7 shows an alternative embodiment of a security document including an optically variable device.
Figure 8:
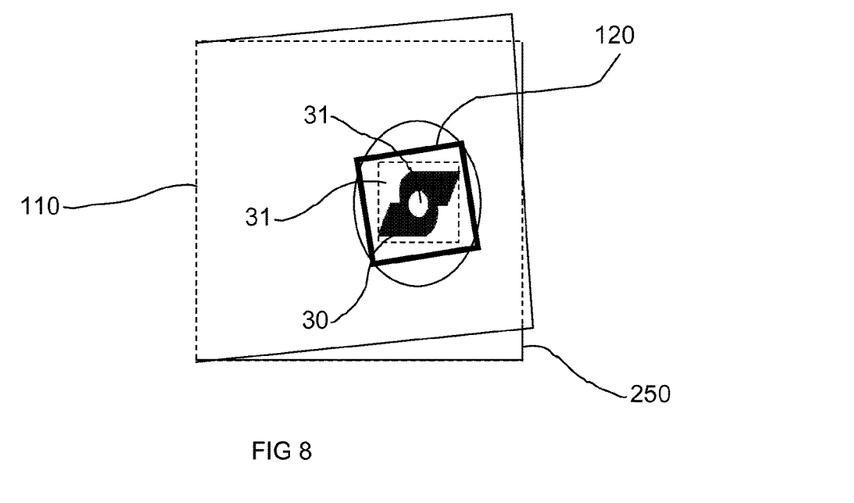
FIG. 8 shows the security document of FIG. 7 folded over so that the optically variable device can be viewed through a polarising filter.

Referring now to FIGS. 7 and 8, there is shown a modified security document 250 in which a polarising filter 120 is built into the document itself. The security document 250 includes a window region 112 containing the same optically variable device 114 as FIGS. 4 to 6. The document 100 can be folded about the (imaginary) line 110 to bring the polariser 120 into register with the optically variable device 114, whereupon an image with bright regions 31 and dark region 30 becomes visible, as in FIG. 5.

Figure 9:
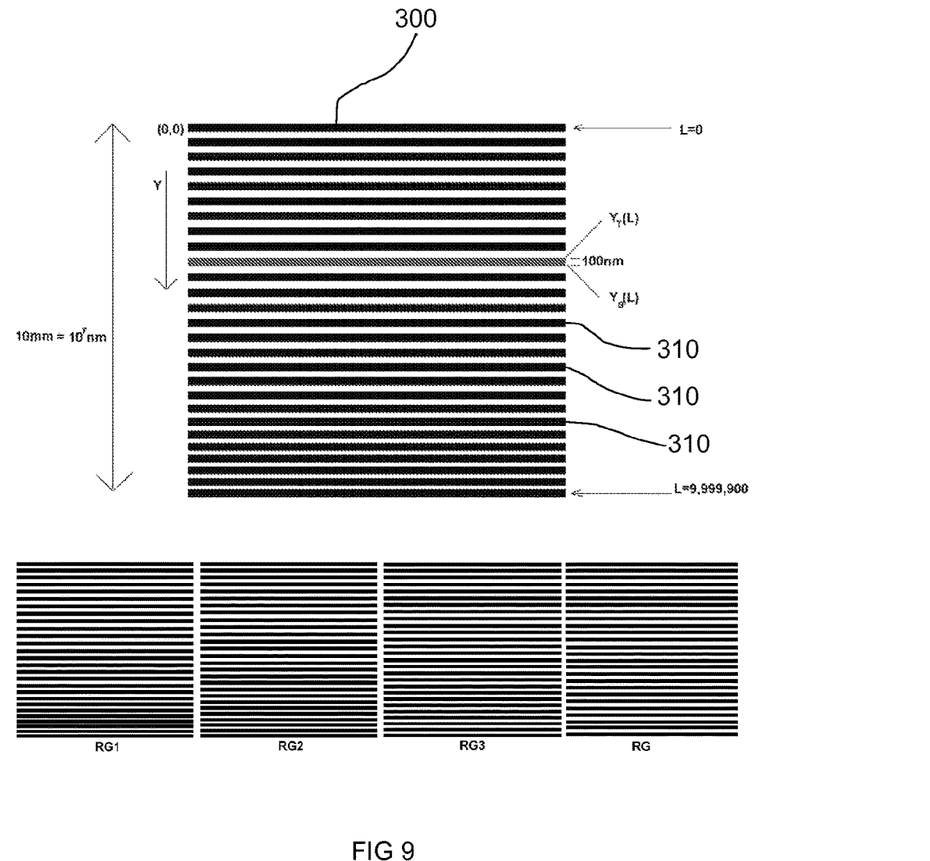
FIG. 9 shows a grating element modulated according to an exemplary method.

A method for modulating the spatial frequency of the pixels 221-224 will now be described with reference to FIG. 9, which shows a grating element 300 of dimensions 10 mm×10 mm, each groove 310 of the grating element 300 having a groove depth of 0.5 micron. It will be appreciated that a grating element 300 may be of any desired size, and will of course be much smaller than 10 mm×10 mm for banknote applications.

The spacing between the grooves 310 of the grating element 300 varies from groove to groove in a mathematically defined way, so as to give different grating elements RG, RG1, RG2, RG3 a different degree of "chirp" or "modulation". The strength of the chirp or modulation would be strongest for pixel RG1, less strong for pixel RG2 and weakest for pixel RG3. Pixel RG has zero chirp—equally spaced straight grooves.

An embossing master for a grating element 300 may be created by electron beam lithography. An address grid of $10^7 \times 10^7$ addressable points within the 10 mm×10 mm area is defined. The distance between adjacent address grid points will therefore be 1 nm. If we use the line index L to describe individual grooves within the grating and define a nominal groove width of 100 nm then the individual grooves of pixels RG, RG1, RG2, RG3 can be defined as follows.

For pixel RG1 we will choose a chirp factor of 0.1 and so define an individual groove on the grating by the equations;

$$Y_T(L)=L[1+0.1\ \mathrm{Sin}(L/(3183091))] \qquad (1a)$$

$$Y_B(L)=[Y_T(L)+Y_T(L+200)]/2 \qquad (1b)$$

The subscripts T and B denote lines describing the top and bottom respectively of the individual groove described by the line index L.

For pixel RG2 we will choose a chirp factor of 0.073 and so define an individual groove on the grating by the equations:

$$Y_T=L[1+0.073\ \mathrm{Sin}(L/(3183091))] \qquad (2a)$$

$$Y_B(L)=[Y_T(L)+Y_T(L+200)]/2 \qquad (2b)$$

For pixel RG3 we will choose a chirp factor of 0.04 and so define an individual groove on the grating by the equations;

$$Y_T(L)=L[1+0.04\ \mathrm{Sin}(L/(3183091))] \qquad (3a)$$

$$Y_B(L)=[Y_T(L)+Y_T(L+200)]/2 \qquad (3b)$$

For pixel RG the modulation factor is zero. Therefore $$Y_T = L \quad (4a)$$

$$Y_B(L) = [Y_T(L) + Y_T(L+200)]/2 \quad (4b)$$

For the four pixels the line index L runs from 0 to ($10^7$-100) in steps of 200. Hence the grooves have a nominal width of 100 nm, with spacings also having a nominal value of 100 nm. The peak to peak nominal groove spacing (i.e. with modulation equal to zero) will therefore be equal to 200 nm.

Figure 10:
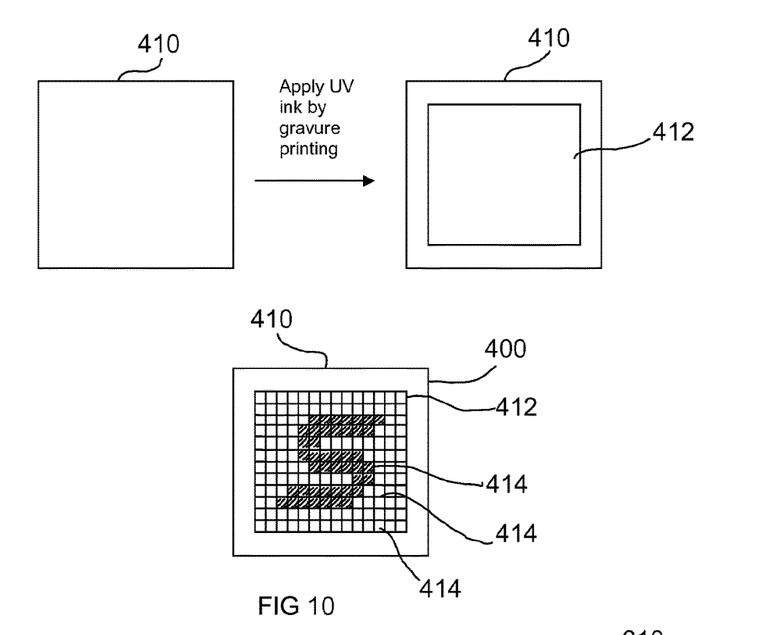
FIGS. 10 and 11 are schematics of a manufacturing method for an optically variable device and security document.

Turning now to FIG. 10, there is shown a method for creating the grating elements of an optically variable device 400. The optically variable device includes a substrate 410, for example one of the abovementioned transparent substrates, to which a patch of embossable radiation curable ink 412 is applied, for example by gravure printing. An embossing master including negatives of a plurality of zero-order grating elements is then applied to the ink 412 to form zero-order grating elements 414. The ink is then cured by ultraviolet light, either after the embossing step, or preferably substantially simultaneously with the embossing step, to create the zero-order grating elements of device 400.

Figure 12:
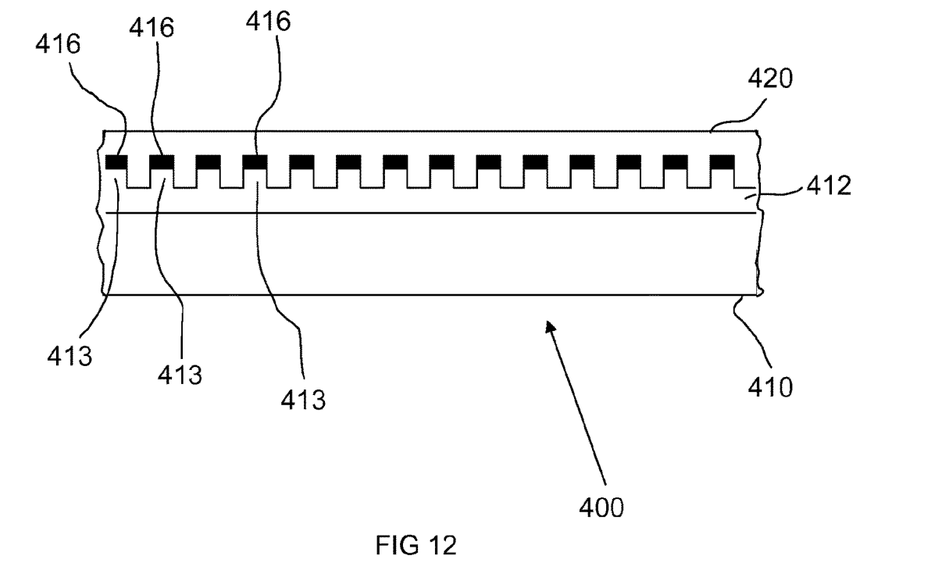
FIG. 12 shows a cross-sectional view through an optically variable device partly manufactured according to the method illustrated in FIG. 10.

FIG. 12 is a cross section through part of the finished zero-order optically variable device 400. Following the embossing and curing steps shown in FIG. 10, a metallic layer or a high refractive index dielectric material 416, in either case having a different refractive index to the embossable ink 412, is applied to the tops of the grooves 413 of grating elements 414. A further layer 420 of a second dielectric material is then applied to fill in the grooves 413. The second dielectric material 420 may have the same refractive index as the embossable ink 412.

It will be appreciated that further layers may be applied as part of the optically variable device 400. For example, if the device 400 is to be applied as a hot stamping foil to another article, such as a security document, then release layers, adhesive layers etc. may be employed in known fashion in the device 400.

Figure 11:
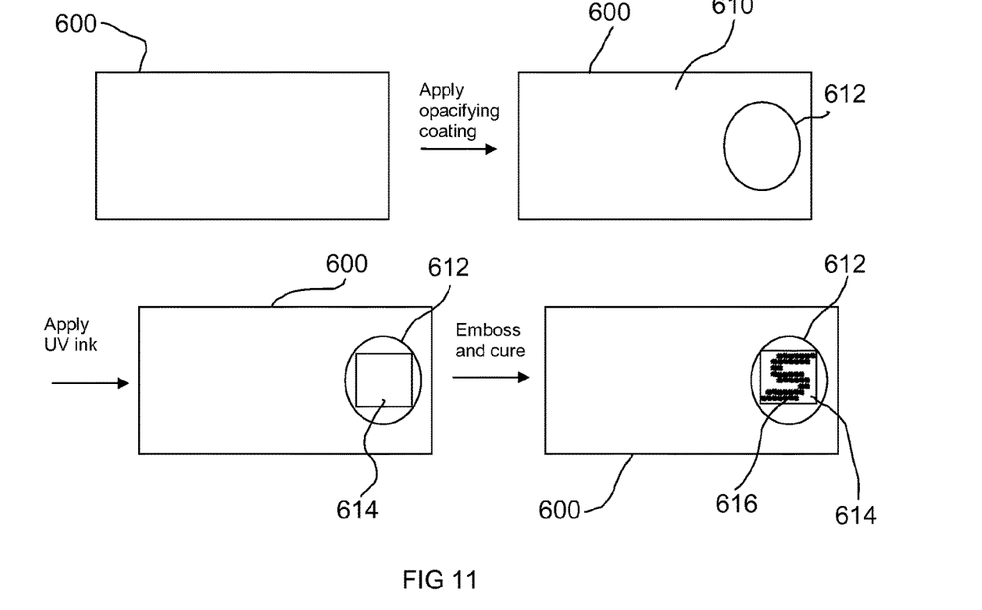

In FIG. 11, there is shown a schematic of a method of forming zero-order diffractive structures directly on a security document or a security document substrate. The security document, in this case a banknote, includes a transparent substrate 600 to which layers of opacifying coating 610 are applied on both sides, apart from in a region 612 so as to form a window (or a half-window, if the coating is omitted in region 612 on one side only). A layer of UV-curable ink 614 is then applied within window or half-window region 612 in any suitable fashion, for example by gravure printing, following which a plurality of grating elements are embossed into the ink 614 and cured as described above, to form a zero-order diffractive security element 616. A metallic or high refractive index dielectric layer and an overcoat of a second dielectric material may then be added in similar fashion to that shown in FIG. 11 in order to form the final security document 600.

Figure 13:
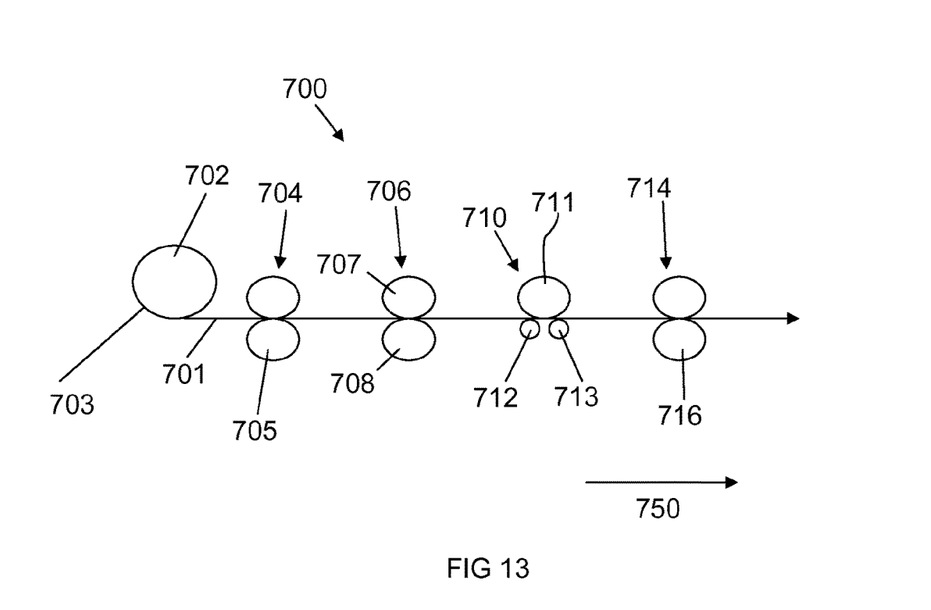
FIG. 13 shows printing and embossing apparatus for manufacturing embodiments of the present invention.

FIG. 13 shows a printing and embossing apparatus 700 suitable for producing one or a plurality of banknotes or other security documents 600 in a reel-to-reel process. It will also be appreciated that the apparatus 700 may be readily modified, if required, to produce one or a plurality of optically variable devices 400 as shown in FIGS. 10 and 12.

The printing and embossing apparatus 700 shown schematically in FIG. 13 includes supply unit 702 for supplying a sheet-like substrate 600 to various printing and embossing stations, including an opacifying station 704, a first printing station 706, an embossing station 710, and a second printing station 714. The substrate 600 is fed through the apparatus in a direction generally indicated as 750.

The substrate 600 is preferably made of a substantially transparent polymeric material and may be continuously supplied to the opacifying station 704 from a roll 703 of the material at the supply unit 702. The opacifying station 704 includes opacifying means for applying at least one opacifying layer 610 to at least one side of the substrate 600. The opacifying means is preferably in the form of a printing unit, eg one or more Gravure printing cylinders 705 for applying one or more opacifying coatings of ink to one or both sides of the substrate. However, it is possible the opacifying station 704 could include opacifying means in the form of a laminating unit for applying one or more sheet-like layers of at least partly opaque material, such as paper or other fibrous material to at least one side of the transparent substrate.

Preferably, the opacifying means 705 at the opacifying station 704 is arranged to omit at least one opacifying layer on one or both sides of the substrate in at least one region 612 to form a window or half-window area.

The first printing station 706 includes printing means 707, 708 for applying a first dielectric material in the form of an embossable radiation-curable ink 614 to the substrate 600. The printing means may comprise at least one printing cylinder 707, eg a Gravure printing cylinder, with the opacified transparent substrate fed between the printing cylinder 707 and a corresponding cylinder or roller 708 on the opposite side of the substrate.

The printing means 707, 708 is arranged to apply the radiation curable ink to a first area 612 of the substrate on which an embossed security element is to be embossed at the embossing station 710.

The embossing station 710 includes embossing means preferably in the form of a plate cylinder 711 and impression cylinder 712. The embossing means 711, 712 includes embossing portions arranged to emboss different areas of the substrate as it passes through the nip between the plate and impression cylinders 711, 712. A first embossing portion is arranged to emboss the first area 612 of the substrate 600 to which the embossable radiation curable ink is applied to form the embossed security element 616.

The embossing station 710 may also include radiation curing means 713 for curing the embossable, radiation curable ink substantially simultaneously or almost immediately after the ink has been embossed to form the embossed security element 616. Alternatively, a separate curing station may be provided. The radiation curing means preferably comprises an ultraviolet (UV) curing unit for curing a UV curable ink, but other types of curing units, eg X-ray or electron beam (EB) curing units may be used for X-ray or EB radiation curable inks.

The second printing station 714 includes printing means for applying printed features to the substrate. The printed means preferably includes a printing cylinder 716 such as a Gravure, offset or intaglio cylinder, and may be used to apply a wide variety of printed features to the substrate. For instance, the printing cylinder 716 at the second printing station 714 may be used to apply printed security features in register with, adjacent to or surrounding the embossed security element 616. One example of a printed security feature could include a printed metallic ink applied over the embossed security device 616. Another example of a printed security feature applied at the second printing station 714 is an area of microprinting which can be viewed or inspected when overlaid by a microlens array.

In operation of the apparatus, the transparent substrate 600 is supplied from the supply unit 702 through the opacifying station 704 where at least one opacifying layer is applied to at least one side of the substrate 600. The at least partly opacified substrate 600 is then fed in direction 750 through the first printing station 706 where the embossable radiation curable ink 614 is applied to the first area 612 which is to be embossed to form the embossed security element 616.

The substrate 701 is then fed in direction 750 through the embossing station 710 where the first area 612 of the substrate 600 is embossed to form the embossed security element 616. The radiation curable ink is then cured by radiation, preferably at the embossing station 710 to fix the embossed structures 616.

The impression cylinder 712 carries the embossing master for the zero-order grating elements of the device 616. In a particularly advantageous embodiment, the grooves of the grating elements are aligned substantially parallel to the direction of movement 750 of the substrate, i.e. substantially perpendicular to the axis of rotation of the impression cylinder 712. This tends to prevent buildup of the embossable ink in the corresponding grooves of the embossing master.

The apparatus 700 may also include further printing stations (not shown) for applying further printed features to the substrate 600.

The invention claimed is:

1. An optically variable device, including:
a plurality of zero-order diffraction grating elements disposed in a plane, wherein unpolarised light and polarised light are incident on the plurality of zero-order diffraction grating elements;
a group of said zero-order diffraction grating elements in at least one region of the device being modulated within said region by varying the spatial frequency, groove curvature and/or groove depth within the grating elements such that a coloured, at least partially polarised first image is visible to a person viewing the device under the unpolarised light, wherein at least one grating parameter of the zero-order diffraction grating element in said region is further modulated within at least some of said zero-order diffraction grating elements to produce variations in brightness,
said group of zero-order diffraction grating elements in said region having at least two orientations, such that a second image, different to the first image, is visible to a person viewing the device under the polarized light,
wherein the group of said zero-order diffraction grating elements form a plurality of pixels of each of the first image and the second image, and further
wherein each of the plurality of pixels, under illumination by the unpolarised light, produces a reflected light of a defined colour, wherein the reflected light is at least partially polarised; and
wherein the person viewing the device observes a first optically variable effect when the device is viewed under unpolarised light and rotated about an axis substantially perpendicular to the plane, and a second optically variable effect when the device is viewed under polarised light and rotated about an axis substantially perpendicular to or parallel with the plane.

2. An optically variable device according to claim 1, wherein the first and/or the second optically variable effect is produced by a change in brightness and/or colour of the grating elements.

3. An optically variable device according to claim 1, wherein at least one grating parameter of the zero-order diffraction grating elements in said region is modulated within at least some of said zero-order diffraction grating elements.

4. An optically variable device according to claim 1, wherein the zero-order diffraction grating elements comprise rectilinear or curvilinear grooves.

5. An optically variable device according to claim 4, wherein the surface density of the zero-order diffraction grating elements within said region is modulated to produce variations in brightness.

6. An optically variable device according to claim 4, wherein the spatial frequency of the zero-order diffraction grating elements is varied according to a harmonic or non-harmonic function.

7. An optically variable device according to claim 4, wherein the grooves are electrically conductive and are separated by non-conducting regions.

8. An optically variable device according to claim 7, wherein the grooves are formed from a conducting material which includes metallic nanoparticles.

9. An optically variable device according to claim 7, wherein the grooves are formed of a non-conducting material to which a conducting material is applied.

10. An optically variable device according to claim 4, wherein the grooves are formed in a first dielectric material which is in contact with a second dielectric material, the second dielectric material having a different refractive index to the first dielectric material.

11. A security document including an optically variable device according to claim 1 and, further including a polariser for producing polarised light to view the optically variable device, wherein the optically variable device and polariser are spaced apart on the security document and can be brought into register by folding the security document.

12. An optically variable device according to claim 1, wherein the first and/or second optically variable effect is a change in shape of the image.

13. An optically variable device according to claim 1, wherein at least one grating parameter of the zero-order diffraction grating elements in said region is modulated relative to grating parameters of neighbouring zero-order diffraction grating elements.

14. A method of manufacturing an optically variable device, including the steps of:
forming a plurality of zero-order diffraction grating elements in or on a surface, wherein unpolarised light and polarised light are incident on the plurality of zero-order diffraction grating elements and modulating a group of the zero-order diffraction grating elements in at least one region of the device within said region by varying the spatial frequency, groove curvature and/or groove depth within the grating elements such that a coloured, at least partially polarised first image is visible to a person viewing the device under the unpolarised light, wherein at least one grating parameter of the zero-order diffraction grating element in said region is further modulated within at least some of said zero-order diffraction grating elements to produce variations in brightness,
said group of zero-order diffraction grating elements in said region having at least two orientations, such that a second image, different to the first image, is visible to a person viewing the device under the polarized light, and wherein the group of said zero-order diffraction grating elements form a plurality of pixels of each of the first image and the second image, and further wherein each of the plurality of pixels, under illumination by the unpolarised light, produces a reflected light of a defined colour, wherein the reflected light is at least partially polarized, wherein the person viewing the device observes a first optically variable effect when the device is viewed under unpolarised light and rotated about an axis substantially perpendicular to the surface, and a second optically variable effect when the device is viewed under polarised light and rotated about an axis substantially perpendicular to or parallel with the surface.

15. A method according to claim 14, wherein the first and/or second optically variable effect is produced by a change in brightness and/or colour of the grating elements.

16. A method according to claim 14, further including the step of applying a layer of a first dielectric material to the surface, wherein the zero-order diffraction grating elements are formed in the first dielectric material.

17. A method according to claim 16, wherein the zero-order diffraction grating elements are embossed in the first dielectric material.

18. A method according to claim 16, further including the step of curing the first dielectric material in at least the embossed regions of the first dielectric material.

19. A method according to claim 14, further including the step of coating the zero-order diffraction grating elements with a second dielectric material, the second dielectric material having a different refractive index to the first dielectric material.

20. A method according to claim 14, wherein the first and/or second optically variable effect is a change in shape of the image.

* * * * *